US012040629B2

(12) United States Patent
Gu et al.

(10) Patent No.: US 12,040,629 B2
(45) Date of Patent: Jul. 16, 2024

(54) WIRELESS POWER RECEPTION DEVICE INCLUDING DETUNING CIRCUIT

(71) Applicant: SAMSUNG ELECTRONICS CO., LTD., Suwon-si (KR)

(72) Inventors: Beomwoo Gu, Suwon-si (KR); Kangho Byun, Suwon-si (KR); Sungku Yeo, Suwon-si (KR); Chongmin Lee, Suwon-si (KR); Bohwan Choi, Suwon-si (KR); Hyoseok Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 227 days.

(21) Appl. No.: 17/683,614

(22) Filed: Mar. 1, 2022

(65) Prior Publication Data

US 2022/0360110 A1    Nov. 10, 2022

Related U.S. Application Data

(63) Continuation of application No. PCT/KR2022/001723, filed on Feb. 4, 2022.

(30) Foreign Application Priority Data

May 4, 2021    (KR) .................. 10-2021-0057666

(51) Int. Cl.
*H02J 50/12*    (2016.01)
*H02J 7/00*    (2006.01)
*H02J 7/34*    (2006.01)

(52) U.S. Cl.
CPC .......... *H02J 50/12* (2016.02); *H02J 7/00308* (2020.01); *H02J 7/007182* (2020.01); *H02J 7/345* (2013.01)

(58) Field of Classification Search
CPC .. H02J 50/12; H02J 7/00308; H02J 7/007182; H02J 7/345
(Continued)

(56) References Cited

U.S. PATENT DOCUMENTS

| 2009/0015075 A1 | 1/2009 | Cook et al. |
| 2011/0281535 A1 | 11/2011 | Low et al. |

(Continued)

FOREIGN PATENT DOCUMENTS

| JP | 2014-187873 A | 10/2014 |
| KR | 10-2013-0082244 A | 7/2013 |

(Continued)

OTHER PUBLICATIONS

Written Opinion (PCT/ISA/237) issued by the International Searching Authority on May 16, 2022 in International Application No. PCT/KR2022/001723.

(Continued)

*Primary Examiner* — Michael R. Fin
(74) *Attorney, Agent, or Firm* — Sughrue Mion, PLLC

(57) ABSTRACT

According to various embodiments, a wireless power reception device for receiving wireless power from a wireless power transmission device may include a first circuit, a first rectifier circuit, a detuning circuit, and a control circuit. The first circuit may include a first coil. The first rectifier circuit may include a first switch and a second switch among a plurality of switches. The detuning circuit may include at least one detuning capacitor and at least one detuning switch. In response to a voltage at an output terminal of the first rectifier circuit exceeding a first voltage, the control circuit may be configured to form a closed loop including the first coil, the first switch, and the second switch by control- (Continued)

ling the at least one detuning switch to an on state and controlling the first switch and the second switch to the on state.

24 Claims, 10 Drawing Sheets

(58) Field of Classification Search
USPC .......................................................... 307/104
See application file for complete search history.

(56) References Cited

U.S. PATENT DOCUMENTS

| | | | |
|---|---|---|---|
| 2012/0303980 A1 | 11/2012 | Culbert et al. | |
| 2013/0099585 A1 | 4/2013 | Von Novak et al. | |
| 2013/0176653 A1 | 7/2013 | Kim et al. | |
| 2014/0091637 A1 | 4/2014 | Endo et al. | |
| 2015/0061590 A1 | 3/2015 | Widmer et al. | |
| 2015/0137611 A1* | 5/2015 | Huang | H02M 7/217 307/104 |
| 2016/0226400 A1 | 8/2016 | Boys et al. | |
| 2017/0018972 A1 | 1/2017 | Culbert et al. | |
| 2018/0048185 A1 | 2/2018 | Hwang et al. | |
| 2018/0083487 A1 | 3/2018 | Nalbant | |
| 2018/0090995 A1* | 3/2018 | Arasaki | H02H 9/041 |
| 2019/0131823 A1 | 5/2019 | Ahn et al. | |
| 2019/0349028 A1 | 11/2019 | Louis | |
| 2019/0372331 A1 | 12/2019 | Liu et al. | |
| 2020/0251896 A1 | 8/2020 | Zhang et al. | |
| 2020/0274397 A1 | 8/2020 | Hwang et al. | |
| 2020/0287382 A1 | 9/2020 | Gao et al. | |

FOREIGN PATENT DOCUMENTS

| | | |
|---|---|---|
| KR | 10-2016-0108156 A | 9/2016 |
| KR | 10-2017-0141101 A | 12/2017 |
| KR | 10-2019-0048925 A | 5/2019 |
| WO | 2011/028956 A2 | 3/2011 |

OTHER PUBLICATIONS

International Search Report (PCT/ISA210) issued by the International Searching Authority dated May 16, 2022 issued in International Application No. PCT/KR2022/001723.

* cited by examiner

WIRELESS POWER RECEPTION DEVICE INCLUDING DETUNING CIRCUIT

CROSS-REFERENCE TO RELATED APPLICATIONS

This application is a Continuation Application of International Application PCT/KR2022/001723 filed on Feb. 4, 2022, which claims benefit of priority from Korean Patent Application No. 10-2021-0057666 filed on May 4, 2021, the disclosures of which are incorporated herein in their entireties by reference.

BACKGROUND

1. Technical Field

The present disclosure relates to a wireless power reception device including a detuning circuit.

2. Description of Related Art

Electronic devices such as smartphones have recently adopted electromagnetic induction-based wireless charging or magnetic resonance-based wireless charging. When a power transmitting unit (PTU) (e.g., a wireless charging pad) and a power receiving unit (PRU) (e.g., a smartphone) come into contact with each other or approach within a certain distance, the battery of the PRU may be charged by electromagnetic induction or electromagnetic resonance between the transmission coil of the PTU and the reception coil of the PRU.

When the PTU induces too high a voltage to the PRU, the PRU may be damaged. The PRU may include a detuning circuit configured to couple one or more additional capacitors to a resonance circuit, when the voltage of received wireless power exceeds a specific level.

SUMMARY

According to various embodiments, a wireless power reception device for receiving wireless power from a wireless power transmission device may include a first circuit, a first rectifier circuit, a second circuit, a detuning circuit, and a control circuit. The first circuit may include a first coil, and a first terminal of the first circuit may be coupled to a ground and to a first terminal of the first rectifier circuit. The first rectifier circuit may include a plurality of switches, a first terminal of a first switch and a first terminal of a second switch among the plurality of switches may be coupled to the ground. The second circuit may include a second coil. A first terminal of the second circuit may be coupled to the ground and the first terminal of the first circuit. A second terminal of the second circuit may be coupled to a first terminal of the detuning circuit. The detuning circuit may include at least one detuning capacitor and at least one detuning switch, and a second terminal of the detuning circuit may be coupled to the ground. In response to a voltage at an output terminal of the first rectifier circuit exceeding a first voltage, the control circuit may be configured to form a closed loop including the first coil, the first switch, and the second switch by controlling the at least one detuning switch to an on state and controlling the first switch and the second switch to the on state.

According to various embodiments, a method of controlling a wireless power reception device may include identifying a voltage at an output terminal of a rectifier circuit of the wireless power reception device, controlling at least one detuning switch included in a detuning circuit of the wireless power reception device to an on state, in response to the voltage at the output terminal of the rectifier circuit exceeding a first voltage, and forming a closed loop by a first coil of the wireless power reception device, a first switch of the wireless power reception device, and a second switch of the wireless power reception device by controlling the first switch and the second switch which are coupled to a ground to the on state among a plurality of switches included in the rectifier circuit.

According to various embodiments, a wireless power reception device for receiving wireless power from a wireless power transmission device may include a first circuit, a first rectifier circuit, a second circuit, a detuning circuit, a second rectifier circuit, and a control circuit. The first circuit may include a first coil, and a first terminal and a second terminal of the first circuit may be coupled to the first rectifier circuit. The first rectifier circuit may include a plurality of switches, a first terminal of a first switch and a first terminal of a second switch among the plurality of switches may be coupled to a ground. The second circuit may include a second coil. A first terminal of the second circuit may be coupled to the ground. A second terminal of the second circuit may be coupled to a first terminal of the detuning circuit. The detuning circuit may include at least one detuning capacitor and at least one detuning switch, and a second terminal of the detuning circuit may be coupled to the ground. The second rectifier circuit may be coupled to the second terminal of the first circuit and the first terminal of the detuning circuit, and an output terminal of the second rectifier may be coupled to an output terminal of the first rectifier circuit. In response to a voltage at the output terminal of the first rectifier circuit exceeding a first voltage, the control circuit may be configured to control the at least one detuning switch to an on state and control the first switch and the second switch to the on state.

According to various embodiments, a wireless power reception device having a detuning circuit is provided. When the voltage of an output terminal of a rectifier circuit exceeds a first voltage, the wireless power reception device according to various embodiments controls two switches included in the rectifier circuit to an on state, thereby preventing mutual inductance between a first coil included in a first circuit and a second coil included in a second coil from excessively increasing a current flowing through the first coil and a detuning switch.

According to various embodiments, a wireless power reception device for receiving wireless power from a wireless power transmission device may comprise a first circuit, a first rectifier circuit, a second circuit, a detuning circuit, and a control circuit. The first circuit may include a first coil, and a first terminal of the first circuit is coupled to a ground and to a first terminal of the first rectifier circuit. The first rectifier circuit may include four switches, and a first terminal of a first switch and a first terminal of a second switch among the four switches are coupled to the ground. The second circuit may include a second coil, a first terminal of the second circuit is coupled to the ground and to the first terminal of the first circuit, and a second terminal of the second circuit is coupled to a first terminal of the detuning circuit. The detuning circuit may include at least one detuning capacitor and at least one detuning switch, and a second terminal of the detuning circuit is coupled to the ground. The control circuit may be configured to identify that a voltage at an output terminal of the first rectifier circuit is lower than or equal to a first voltage, while the at least one detuning switch is controlled to the on state, and the first switch and the second switch are controlled to the on state, and control, in response to the voltage at the output terminal of the first rectifier circuit being identified as lower than or equal to the first voltage, the at least one detuning switch to an off state.

DETAILED DESCRIPTION

Figure 1:
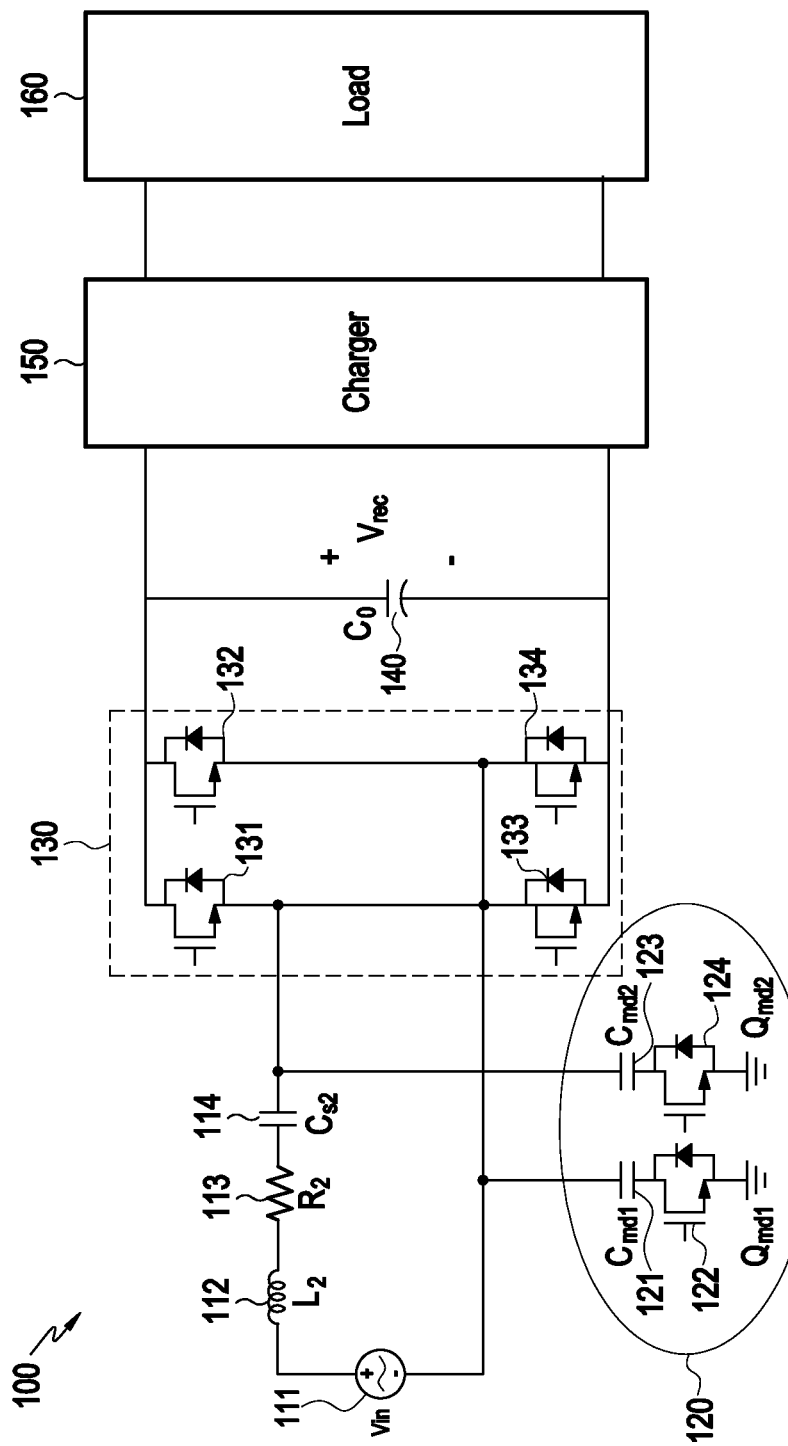
FIG. 1 is a circuit diagram illustrating a wireless power reception device according to a comparative example.

FIG. 1 is a circuit diagram illustrating a wireless power reception device according to a comparative example. Referring to FIG. 1, a wireless power reception device 100 includes a resonance circuit including a first coil 112 and a first capacitor 114, a detuning circuit 120, a rectifier circuit 130, a second capacitor 140, and a charger 150, and a load 160.

A voltage may be induced in the first coil 112 included in the resonance circuit, based on a change in a magnetic field generated by a wireless power transmission device (not shown). The induction of a voltage to the first coil 112 included in the resonance circuit based on a change a magnetic field generated by the wireless power transmission device may be expressed as reception of wireless power from the wireless power transmission device at the wireless power reception device 100. The voltage induced in the first coil 112 is denoted by $V_{in}$ 111 in FIG. 1. The resistance of a parasitic resistor 113 in the first coil 112 is denoted by $R_2$.

The detuning circuit 120 may include one or more detuning capacitors 121 and 123 and one or more detuning switches 122 and 124.

The rectifier circuit 130 may include four switches 131, 132, 133, and 134 which form a full bridge structure. Each of the four switches 131, 132, 133, and 134 may be an N-channel metal oxide semiconductor field-effect transistor (MOSFET) and may include a body diode. The rectifier circuit 130 may rectify wireless power received from the resonance circuit from alternating current (AC) to direct current (DC) so that a rectified voltage $V_{rec}$ is applied to both ends of the second capacitor 140.

The load 160 may include a control circuit for generating a drive signal to control the four switches 131, 132, 133, 134 and the detuning switches 122 and 124, a DC/DC converter, a low dropout regulator (LDO), and a battery.

Depending on the positions of the wireless power reception device 100 and the wireless power transmission device, the magnitude of the voltage induced in the first coil 112 may be so high as to damage the wireless power reception device 100. The control circuit may then control the detuning switches 122 and 124 from an off state to an on state. When the detuning switches 122 and 124 are controlled to the on state, a voltage equal to or higher than the threshold voltage of a MOSFET included in the detuning switches 122 and 124 may be applied to the gate of the MOSFET.

When the detuning switches 122 and 124 are controlled to the on state, as a voltage is induced in the first coil 112, the same current may flow through the first coil 112, the parasitic resistor 113, the first capacitor 114, the detuning capacitor 123, the detuning switches 122 and 124, and the detuning capacitor 121. A current $I_{coil}$ flowing through the first coil 112 and a current $I_{Qmd}$ flowing through the detuning switches 122 and 124 are given by Eq. 1.

$$I_{coil} = I_{Qmd} = \frac{V_{in}}{R_2 + j\omega L_2 + \frac{1}{j\omega C_{S2}} + \frac{1}{j\omega C_{md1}} + \frac{1}{j\omega C_{md2}}} \quad \text{(Eq. 1)}$$

The voltage $V_{rec}$ of an output terminal of the rectifier circuit 130 is expressed as Eq. 2.

$$V_{rec} = \sqrt{2}\left(\frac{1}{j\omega C_{md1}} + \frac{1}{j\omega C_{md2}}\right)I_{Qmd} \quad \text{(Eq. 2)}$$

As noted from Eq. 2, when the detuning switches 122 and 124 are controlled to the on state, the detuning capacitors 121 and 123 are required to have large enough capacitances in order to sufficiently reduce the voltage $V_{rec}$ of an output terminal of the rectifier circuit 130. However, when the detuning capacitors 121 and 123 are designed to have large capacitances, the current $I_{coil}$ flowing in the first coil 112 and the current $I_{Qmd}$ flowing in the detuning switches 122 and 124 may increase, as noted from Eq. 1. That is, an overcurrent may flow through the first coil 112 and the detuning switches 122 and 124.

Figure 2:
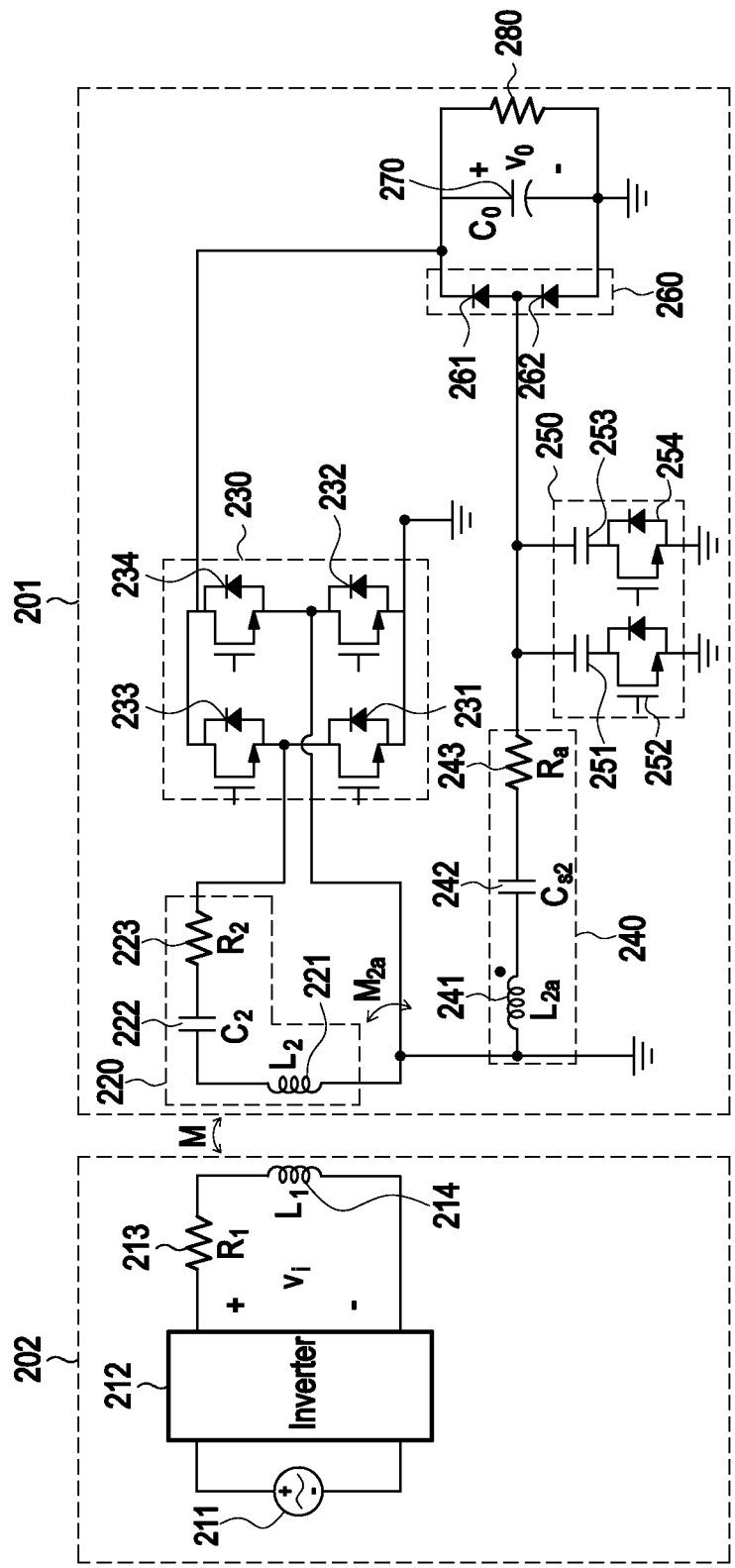
FIG. 2 is a circuit diagram illustrating a wireless power transmission device and a wireless power reception device according to various embodiments.

FIG. 2 is a circuit diagram illustrating a wireless power transmission device and a wireless power reception device according to various embodiments.

Referring to FIG. 2, a wireless power transmission device 202 may include a power source 211, an inverter 212, and a transmission coil 214. The transmission coil 214 may have a parasitic resistor 213 with a resistance $R_1$. The power source 211 may output direct current (DC) power, and the inverter 212 may convert the DC power received from the power source 211 into alternating current (AC) power. The transmission coil 214 may generate a magnetic field based on an AC voltage received from the inverter 212.

According to various embodiments, a wireless power reception device 201 may include a first circuit 220, a first rectifier circuit 230, a second circuit 240, a detuning circuit 250, a second rectifier circuit 260, a capacitor 270, and a load 280.

According to various embodiments, the first circuit 220 may include a first coil 221 and a first capacitor 222, and the first coil 221 may have a parasitic resistor 223 with a resistance $R_2$. A first terminal of the first circuit 220 may be coupled to the ground, a first terminal of the second circuit 240, and a first input terminal of the first rectifier circuit 230. As the magnitude of the magnetic field generated by the transmission coil 214 changes, an induced electromotive force may be generated in the first coil 221. Generation of an induced electromotive force in the first coil 221 may be expressed as reception of wireless power in the first circuit 220 or the wireless power reception device 201. A second terminal of the first circuit 220 may be coupled to a second input terminal of the first rectifier circuit 230.

According to various embodiments, the first rectifier circuit 230 may include four switches 231, 232, 233, and 234 which form a full bridge structure. Each of the four switches 231, 232, 233, and 234 may be an N-channel MOSFET and have a body diode. The first rectifier circuit 230 may rectify the wireless power received from the first circuit 220 from an AC form to a DC form, so that a rectified voltage $V_o$ is applied to both terminals of the capacitor 270. According to various embodiments, first terminals of the first switch 231 and the second switch 232 in the first rectifier circuit 230 may be coupled to the ground. A second terminal of the first switch 231, as the second input terminal of the first rectifier circuit 230, may be coupled to the second terminal of the first circuit 220, and a second terminal of the second switch 232, as the first input terminal of the first rectifier circuit 230, may be coupled to the first terminal of the first circuit 220. A point between the third switch 233 and the fourth switch 234 may be defined as an output terminal of the first rectifier circuit 230. According to various embodiments, a voltage applied to the gates of MOSFETs included in the four switches 231, 232, 233, and 234 may be controlled by a control circuit (not shown). An exemplary structure of the control circuit is described with reference to FIG. 5. The control circuit may control turn-on of the four switches 231, 232, 233, and 234 by applying a voltage equal to or higher than the threshold voltage of the MOSFETs to the gates of the MOSFETs included in the four switches 231, 232, 233, and 234, and/or control turn-off of the four switches 231, 232, 233, and 234 by applying a voltage less than the threshold voltage of the MOSFETs to the gates of the MOSFETs.

According to various embodiments, the second circuit 240 may include a second coil 241 and a second capacitor 242. The second coil 241 may have a parasitic resistor 243 with a resistance $R_q$. The first terminal of the second circuit 240 may be coupled to the first terminal of the first circuit 220 and the ground, and a second terminal of the second circuit 240 may be coupled to the second rectifier circuit 260 and the detuning circuit 250.

According to various embodiments, the detuning circuit 250 may include at least one detuning capacitor (e.g., detuning capacitors 251 and 253) and at least one detuning switch (e.g., detuning switches 252 and 254). Although the two detuning capacitors 251 and 253 and the two detuning switches 252 and 254 are illustrated in FIG. 2, the number of detuning capacitors and the number of detuning switches included in the detuning circuit 250 are not limited according to various embodiments. According to various embodiments, the number of detuning capacitors included in the detuning circuit 250 may be equal to that of detuning switches included in the detuning circuit 250. According to various embodiments, a first terminal of the detuning circuit 250 may be coupled to the second terminal of the second circuit 240 and the second rectifier circuit 260, and a second terminal of the detuning circuit 250 may be coupled to the ground.

According to various embodiments, each of the at least one detuning switch 252 and 254 may be an N-channel MOSFET and have a body diode. According to various embodiments, a voltage applied to the gates of MOSFETs included in the at least one detuning switch 252 and 254 may be controlled by the control circuit. The control circuit may control turn-on of the at least one detuning switch 252 and 254 by applying a voltage equal to or higher than the threshold voltage of the MOSFETs to the gates of the MOSFETs included in the at least one detuning switch 252 and 254 or turn-off of the at least one detuning switch 252 and 254 by applying a voltage less than the threshold voltage of the MOSFETs to the gates of the MOSFETs.

According to various embodiments, the second rectifier circuit 260 may include two diodes (e.g., 261 and 262) forming a half bridge structure. Alternatively or additionally, the second rectifier circuit 260 may include two MOSFETs forming the half bridge structure. According to various embodiments, an output terminal of the second rectifier circuit 260 may be coupled to the output terminal of the first rectifier circuit 230.

According to various embodiments, the load 280 may include a control circuit for generating a drive signal to control the four switches 231, 232, 233, and 234, and at least one detuning switch 252 and 254, a DC/DC converter, an LDO, and a battery.

Figure 3:
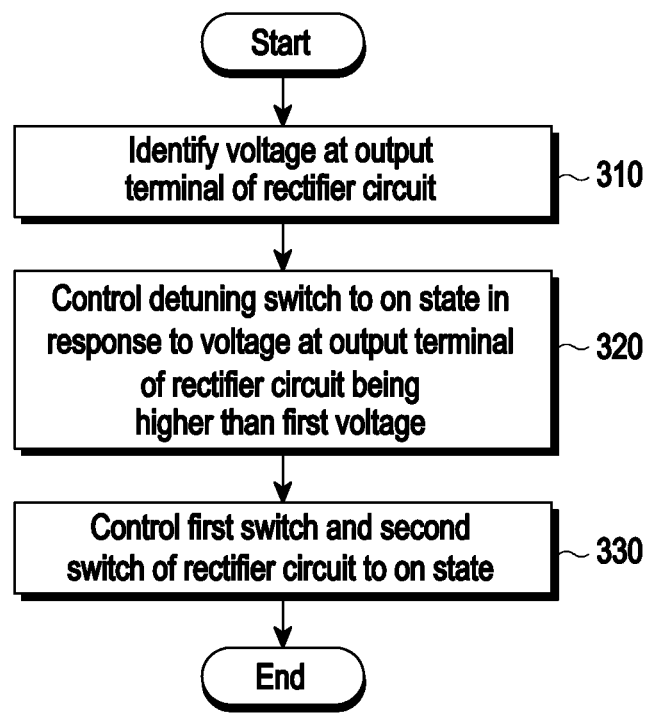
FIG. 3 is a flowchart illustrating operations performed by a wireless power reception device according to various embodiments.

FIG. 3 is a flowchart illustrating exemplary operations performed by a wireless power reception device according to various embodiments.

In operation 310, a control circuit of a wireless power reception device (e.g., the wireless power reception device 201) may identify a voltage at an output terminal of a rectifier circuit. For example, referring to FIG. 2, the control circuit may identify the voltage $V_o$ of the output terminals of the first rectifier circuit 230 and the second rectifier circuit 260.

In operation 320, the control circuit of the wireless power reception device 201 may control a detuning switch to an on state in response to the voltage $V_o$ of the output terminal of the rectifier circuit exceeding a first voltage. For example, referring to FIG. 2, the control circuit may control the detuning switches 252 and 254 to the on state in response to the voltage $V_o$ of the output terminal exceeding the first voltage.

In operation 330, the control circuit of the wireless power reception device 201 may control a first switch and a second switch of the rectifier circuit to the on state. For example, referring to FIG. 2, the control circuit may control the first switch 231 and the second switch 232 of the first rectifier circuit 230 to the on state. According to various embodiments, in operation 330, the control circuit of the wireless power reception device 201 may control the third switch 233 and the fourth switch 234 of the first rectifier circuit 230 to an off state. According to various embodiments, when the control circuit controls the first switch 231 and the second switch 232 to the on state, the first coil 221, a closed-loop including the first switch 231, and the second switch 232 may be formed. For example, the first coil 221, the first switch 231, the second switch 232, the first capacitor 222, and the parasitic resistor 223 may form a closed loop.

Figure 4A:
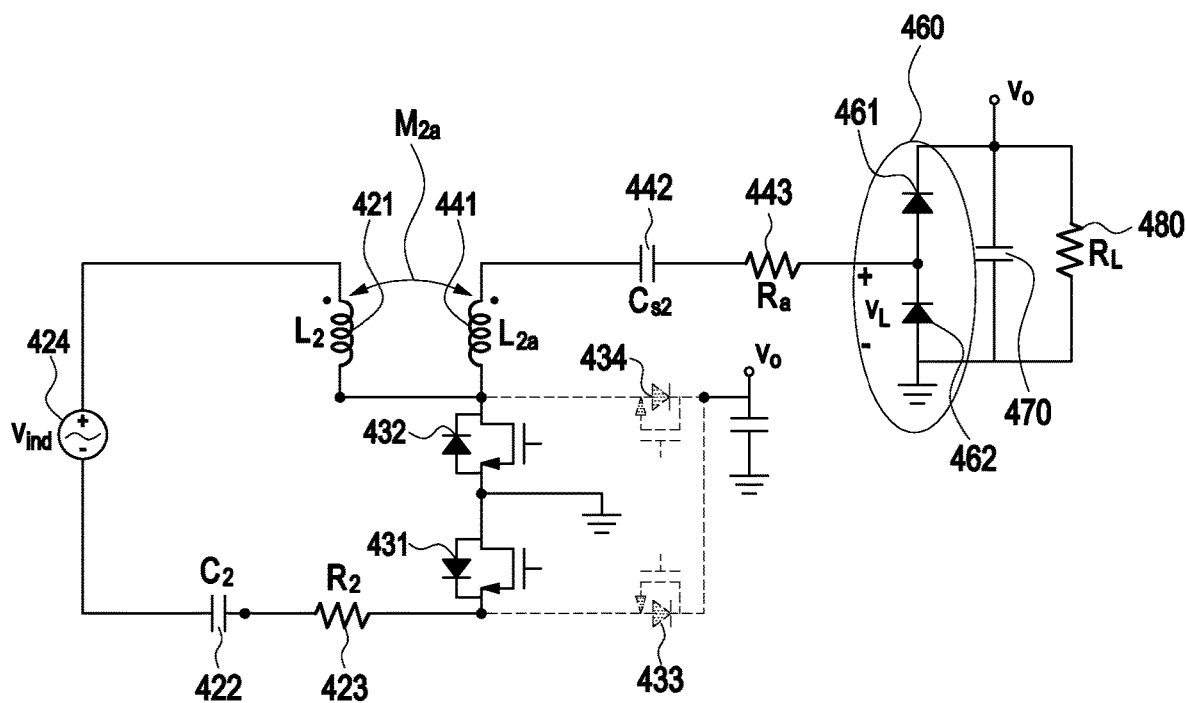
FIG. 4A is a diagram illustrating an equivalent circuit of a wireless power reception device according to various embodiments.

FIG. 4A illustrates an equivalent circuit of a wireless power reception device according to various embodiments. In particular, FIG. 4A illustrates an equivalent circuit of the wireless power reception device 201 of FIG. 2, when the first switch 231 and the second switch 232 of the first rectifier circuit 230 are controlled to the on state, and the third switch 233 and the fourth switch 234 of the first rectifier circuit 230 are controlled to the off state. The components illustrated in FIG. 4A correspond to the components illustrated in FIG. 2, and similar reference numerals are used for the corresponding components. In FIG. 4A, components through which no current flows are indicated by dotted lines (e.g., switches 433 and 434).

In FIG. 4A, an electromotive force induced in a first coil 421 based on a magnetic field generated by the wireless power transmission device 202 is represented as electromotive force $V_{ind}$ 424. As described above with reference to operation 330 of FIG. 3, when the control circuit controls a first switch 431 and a second switch 432 to the on state, a closed loop including the first coil 421, the first switch 431, and the second switch 432 may be formed. For example, the first coil 421, the first switch 431, the second switch 432, a first capacitor 422, and a parasitic resistor 423 may form the closed loop.

According to various embodiments, a current may flow in the closed loop including the first coil 421, the first switch 431, and the second switch 432 based on the electromotive force $V_{ind}$ 424 induced in the first coil 421. Based on the current flowing in the closed loop, the first coil 421 may form a magnetic field, and an electromotive force may be induced in a second coil 441 based on the formed magnetic field. Power may be transferred to a load 480 based on the electromotive force induced in the second coil 441. That is, as the electromotive force is inducted in the second coil 441 based on the magnetic field formed by the current flowing in the closed loop including the first coil 421, the first switch 431 and the second switch 432 of the wireless power reception device 201 may receive wireless power.

Referring to FIG. 4A, since the at least one detuning switch 252 and 254 included in the detuning circuit 250 is controlled to be the off state, the at least one detuning capacitor 251 and 253 included in the detuning circuit 250 may be ignored. Referring to FIG. 4A, a voltage $V_L$ applied to the second rectifier circuit 460 is calculated by Eq. 3.

$$V_L = \frac{jV_{ind}Z_0 R_L}{\omega M_{2a}\left(Z_0 + j\omega L_{2a} + R_\alpha + \frac{1}{j\omega C_{S2}} + R_L\right)} \quad \text{(Eq. 3)}$$

In Equation 3, $M_{2a}$ is the mutual inductance between the first coil 421 and the second coil 441.
In Eq. 3, $Z_0$ may be expressed as Eq. 4.

$$Z_0 = \frac{(\omega M_{2a})^2}{j\omega L_2 + R_2 + \frac{1}{j\omega C_2}} \quad \text{(Eq. 4)}$$

Figure 4B:
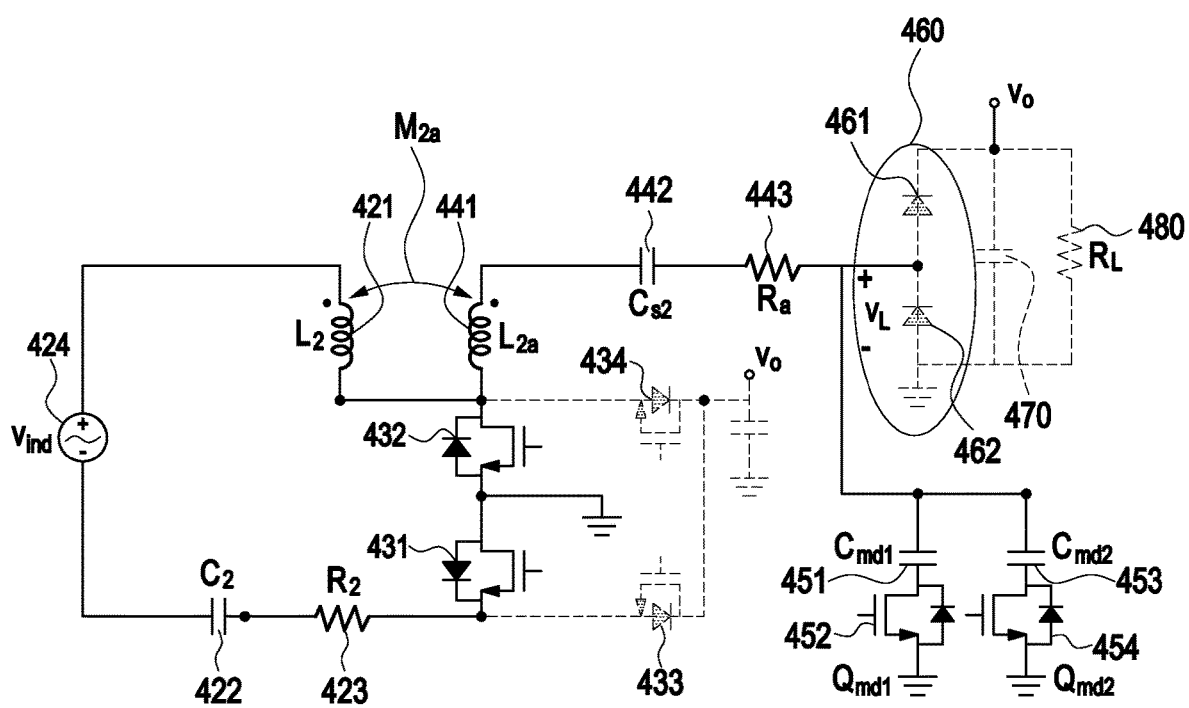
FIG. 4B is a diagram illustrating an equivalent circuit of a wireless power reception device according to various embodiments.

FIG. 4B illustrates an equivalent circuit of a wireless power reception device according to various embodiments. In particular, FIG. 4B illustrates an equivalent circuit of the wireless power reception device 201 of FIG. 2, when the operations of FIG. 3 are performed. The components illustrated in FIG. 4B correspond to the components illustrated in FIG. 2, and similar reference numerals are used for the corresponding components. In FIG. 4B, components through which no current flows are indicated by dotted lines (e.g., switches 433 and 434, diodes 461 and 462, capacitor 470, and load 480).

Referring to FIG. 4B, the first switch 231 and the second switch 232 of the first rectifier circuit 230 may be controlled to the on state, the third switch 233 and the fourth switch 234 of the first rectifier circuit 230 may be controlled to the off state, and the at least one detuning switch 252 and 254 included in the detuning circuit 250 may be controlled to the on state. FIG. 4B is different from FIG. 4A in that the at least one detuning capacitor 451 and 453 may not be ignored. In the circuit of FIG. 4B, the voltage $V_L$ applied to the second rectifier circuit 260 is calculated by Eq. 5.

$$V_L = \frac{jV_{ind}Z_0 Z_{cmd}}{\omega M_{2a}\left(Z_0 + j\omega L_{2a} + R_\alpha + \frac{1}{j\omega C_{S2}} + Z_{cmd}\right)} \quad \text{(Eq. 5)}$$

In Eq. 5, $M_{2a}$ is the mutual inductance between the first coil 421 and the second coil 441. In Eq. 5, $Z_0$ may be expressed as Eq. 4.

In the circuit of FIG. 4B, the voltage $V_L$ applied to the second rectifier circuit 260 may be approximated by Eq. 6.

$$V_L \approx \frac{jV_{ind}Z_{cmd}}{\omega M_{2a}} \approx \frac{V_{ind}}{2} \quad \text{(Eq. 6)}$$

A comparison between Eqs. 6 and 5 and Eq. 3 reveals that since the equivalent impedance $Z_{cmd}$ of the detuning capacitors 451 and 453 are small, the voltage $V_L$ applied to the second rectifier circuit 460 decreases in the circuit of FIG. 4B, compared to the circuit of FIG. 4A.

In the circuit of FIG. 4B, a current $I_{coil}$ flowing through the first coil 421 may be approximated by Eq. 7.

$$I_{coil} \approx \frac{V_{in}}{R_2 + j\omega L_2 + \frac{1}{j\omega C_{S2}} + \frac{(\omega M_{2a})^2}{\frac{1}{j\omega C_{md1}} + \frac{1}{j\omega C_{md2}}}} \quad \text{(Eq. 7)}$$

In the circuit of FIG. 4B, a current $I_{Qmd}$ flowing through each of the at least one detuning switch 452 and 454 may be approximated by Eq. 8.

$$I_{Qmd} \approx \frac{jV_{in}Z_0}{\omega M_{2a}\left(\frac{1}{j\omega C_{md1}} + \frac{1}{j\omega C_{md2}}\right)} \quad \text{(Eq. 8)}$$

In Eq. 8, $Z_0$ may be expressed as Eq. 4.
A comparison between Eqs. 7 and 8 and Eq. 1 reveals that the current $I_{coil}$ flowing in the first coil 421 and the current $I_{Qmd}$ flowing through each of the at least one of the detuning switches 452 and 454 are smaller than those of Eq. 1 under the action of the mutual inductance between the first coil 421 and the second coil 441 in the circuit of FIG. 4B. Accordingly, the circuit of FIG. 4B may prevent an overcurrent from flowing through the first coil 421 and each of the at least one detuning switch 452 and 454.

As described above with reference to FIG. 4A, since the control circuit controls the first switch 431 and the second switch 432 to the on state, a closed loop including the first coil 421, the first switch 431, and the second switch 432 may be formed. For example, the first coil 421, the first switch 431, the second switch 432, the first capacitor 422, and the parasitic resistor 423 may form the closed loop.

According to various embodiments, a current may flow in the closed loop including the first coil 421, the first switch 431, and the second switch 432 based on the electromotive force $V_{ind}$ 424 induced in the first coil 421. Based on the current flowing in the closed loop, the first coil 421 may form a magnetic field, and an electromotive force may be induced in the second coil 441 based on the formed magnetic field. As the electromotive force is inducted in the second coil 441 based on the magnetic field formed by the current flowing in the closed loop including the first coil 421, the first switch 431 and the second switch 432 of the wireless power reception device 201 may receive wireless power.

Figure 5:
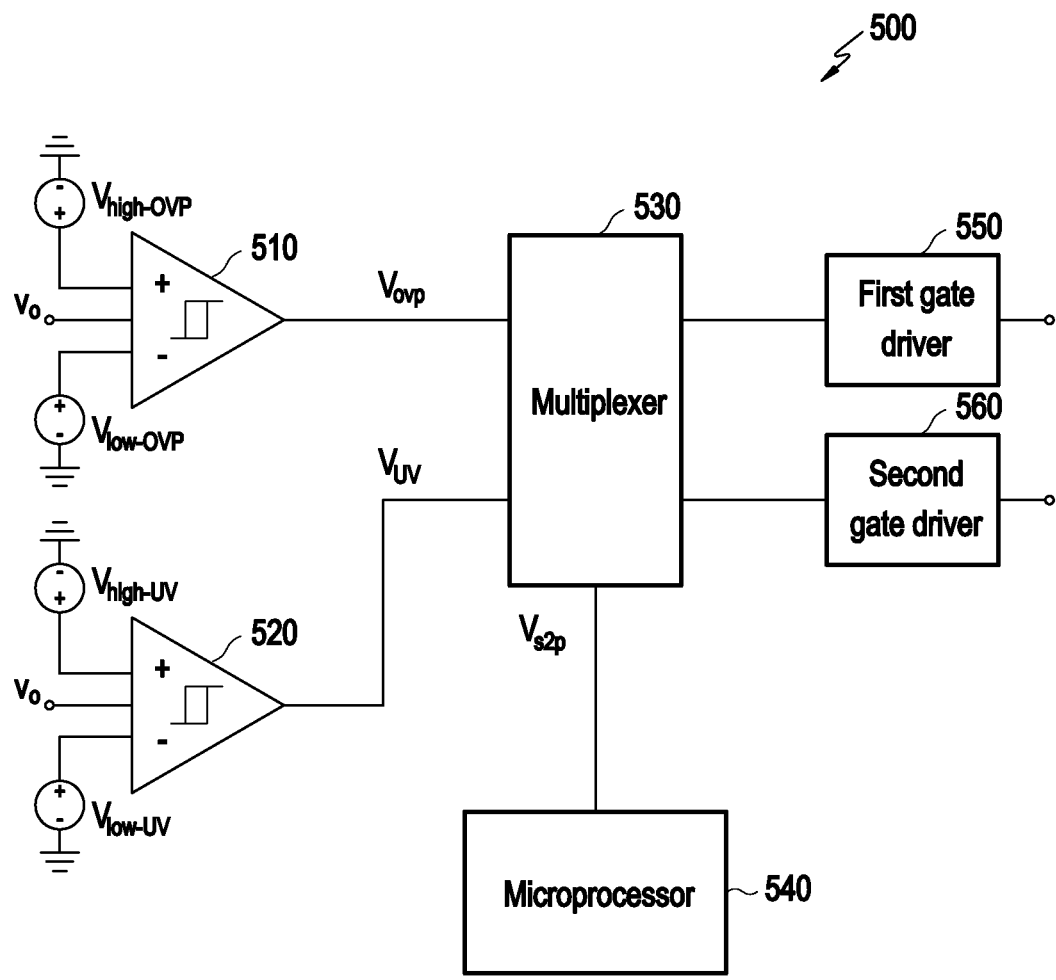
FIG. 5 is a diagram illustrating a control circuit of a wireless power reception device according to various embodiments.

FIG. 5 illustrates a control circuit of a wireless power reception device (e.g., wireless power reception device 201 of FIG. 2) according to various embodiments. According to various embodiments, a control circuit 500 may include a first hysteresis comparator 510, a second hysteresis comparator 520, a multiplexer 530, a microprocessor 540, a first gate driver 550, and a second gate driver 560.

According to various embodiments, the first hysteresis comparator 510 may compare a voltage $V_o$ at a particular point of the wireless power reception device 201 with a first voltage $V_{high-OVP}$ and a second voltage $V_{low-OVP}$. The first voltage $V_{high-OVP}$ may be higher than the second voltage $V_{low-OVP}$. For example, the particular point of the wireless power reception device 201 may be the output terminal of the first rectifier circuit 230 and the second rectifier circuit 260 of FIG. 2. When the voltage $V_o$ is higher than the first voltage $V_{high-OVP}$, the first hysteresis comparator 510 may transmit a high output signal $V_{ovp}$ to the multiplexer 530. When the voltage $V_o$ falls to or below the second voltage $V_{low-OVP}$ after the high output signal $V_{ovp}$ is transmitted to the multiplexer 530, the first hysteresis comparator 510 may transmit a low output signal $V_{ovp}$ to the multiplexer 530. The high output signal $V_{ovp}$ may indicate that an overvoltage is being induced in the wireless power reception device 201.

According to various embodiments, the second hysteresis comparator 520 may compare the voltage $V_o$ at the particular point of the wireless power reception device 201 with a third voltage $V_{high-UV}$ and a fourth voltage $V_{low-UV}$. The third voltage $V_{high-UV}$ may be higher than the fourth voltage $V_{low-UV}$. For example, the particular point of the wireless power reception device 201 may be the output terminal of the first rectifier circuit 230 and the second rectifier circuit 260 of FIG. 2. When the voltage $V_o$ falls down to or below the fourth voltage $V_{low-UV}$, the second hysteresis comparator 520 may transmit a low output signal $V_{UV}$ to the multiplexer 530. When the voltage $V_o$ rises above the third voltage $V_{high-UV}$ after the low output signal $V_{UV}$ is transmitted to the multiplexer 530, the second hysteresis comparator 520 may transmit a high output signal $V_{UV}$ to the multiplexer 530. The low output signal $V_{UV}$ may indicate that too low a voltage is being induced in the wireless power reception device 201.

According to various embodiments, the microprocessor 540 may transmit an output signal $V_{s2p}$ indicating whether the resonance circuit of the wireless power reception device 201 is to receive wireless power by series resonance or parallel resonance to the multiplexer 530. For example, a high output signal $V_{s2p}$ indicates that the resonant circuit of the wireless power reception device 201 is preferably to receive wireless power by parallel resonance, and a low output signal $V_{s2p}$ indicates that the resonance circuit of the wireless power reception device 201 is preferably to receive wireless power by series resonance.

According to various embodiments, the first circuit 220 and the second circuit 240 of the wireless power reception device 201 illustrated in FIG. 2 may form a resonance circuit. In the example of FIG. 2, when the four switches 231, 232, 233, and 234 included in the first rectifier circuit 230 are synchronously controlled according to the waveform of an input voltage, or the four switches 231, 232, 233, and 234 are controlled to the off state, the resonance circuit of the wireless power reception device 201 may receive wireless power by series resonance. When it is said that the resonance circuit of the wireless power reception device 201 receives wireless power by series resonance, this may imply that wireless power is received by an induced electromotive force generated in the first coil 221 and the second coil 241 based on a magnetic field generated by the wireless power transmission device 202. In the example of FIG. 2, when the first switch 231 and the second switch 232 are controlled to the on state, and the third switch 233 and the fourth switch 234 are controlled to the off state among the four switches 231, 232, 233, and 234 included in the first rectifier circuit 230, the resonance circuit of the wireless power reception device 201 may receive wireless power by parallel resonance. When it is said that the resonance circuit of the wireless power reception device 201 receives wireless power by parallel resonance, this may imply that as an induced electromotive force is generated in the first coil 221 based on a magnetic field generated by the wireless power transmission device 202, and an induced electromotive force is generated in the second coil 241 based on a magnetic field generated by the first coil 221, wireless power is received.

According to various embodiments, the first gate driver 550 may output a driving signal for controlling on/off of the at least one detuning switch 252 and 254 included in the detuning circuit (e.g., the detuning circuit 250) based on a control signal from the multiplexer 530.

According to various embodiments, the second gate driver 560 may output a driving signal for controlling on/off of the four switches 231, 232, 233 and 234 included in the rectifier circuit (e.g., the first rectifier circuit 230) based on a control signal from the multiplexer 530.

According to various embodiments, the multiplexer 530 may control the first gate driver 550 and the second gate driver 560 based on the signal $V_{ovp}$ received from the first hysteresis comparator 510 and the signal $V_{s2p}$ received from the microprocessor 540. According to various embodiments, upon receipt of the high signal $V_{ovp}$ and the high signal $V_{s2p}$, the multiplexer 530 may control the first gate driver 550 to output a driving signal for controlling the at least one detuning switch 252 and 254 to the on state, and control the second gate driver 560 to output a driving signal for controlling the first switch 231 and the second switch 232 to the on state and the third switch 233 and the fourth switch 234 to the off state among the four switches 231, 232, 233, and 234. According to various embodiments, to control the first switch 231 and the second switch 232 to the on state and the third switch 233 and the fourth switch 234 to the off state among the four switches 231, 232, 233, and 234 after the at least one detuning switch 252 and 254 is switched to the on state, the multiplexer 530 may control the second gate driver 560 a predetermined time after control of the first gate driver 550.

According to various embodiments, upon receipt of the high signal $V_{ovp}$ and the low signal $V_{s2p}$, the multiplexer 530 may control the first gate driver 550 to output a driving signal for controlling the at least one detuning switch 252 and 254 to the onstate, and control the second gate driver 560 to output a driving signal for controlling the first switch 231 and the second switch 232 to the on state and the third switch 233 and the fourth switch 234 to the off state among the four switches 231, 232, 233, and 234. According to various embodiments, to control the first switch 231 and the second switch 232 to the on state and the third switch 233 and the fourth switch 234 to the off state among the four switches 231, 232, 233, and 234 after the at least one detuning switch 252 and 254 is switched to the on state, the multiplexer 530 may control the second gate driver 560 a predetermined time after control of the first gate driver 550.

According to various embodiments, upon receipt of the low signal $V_{ovp}$ and the high signal $V_{s2p}$, the multiplexer 530 may control the first gate driver 550 to output a driving signal for controlling the at least one detuning switch 252 and 254 to the off state, and control the second gate driver 560 to output a driving signal for controlling the first switch 231 and the second switch 232 to the on state and the third switch 233 and the fourth switch 234 to the off state among the four switches 231, 232, 233, and 234. According to various embodiments, to control the first switch 231 and the second switch 232 to the on state and the third switch 233 and the fourth switch 234 to the off state among the four switches 231, 232, 233, and 234 after the at least one detuning switch 252 and 254 is switched to the off state, the multiplexer 530 may control the second gate driver 560 a predetermined time after control of the first gate driver 550.

According to various embodiments, upon receipt of the low signal $V_{ovp}$ and the high signal $V_{s2p}$, the multiplexer 530 may control the first gate driver 550 to output a driving signal for controlling the at least one detuning switch 252 and 254 to the off state, and control the second gate driver 560 to output a driving signal for controlling the four switches 231, 232, 233, and 234 to the off state or controlling the four switches 231, 232, 233, and 234 synchronously. According to various embodiments, to control the at least one detuning switch 252 and 254 to the off state after control of the four switches 231, 232, 233, and 234 to the off state or to synchronous control of the four switches 231, 232, 233, and 234, the multiplexer 530 may control the first gate driver 550 a predetermined time after control of the second gate driver 560.

According to various embodiments, the multiplexer 530 may control the first gate driver 550 and the second gate driver 560, further relying on the signal $V_{UV}$ received from the second hysteresis comparator 520 in addition to the signal $V_{ovp}$ received from the first hysteresis comparator 510 and the signal $V_{s2p}$ received from the microprocessor 540.

Figure 6:
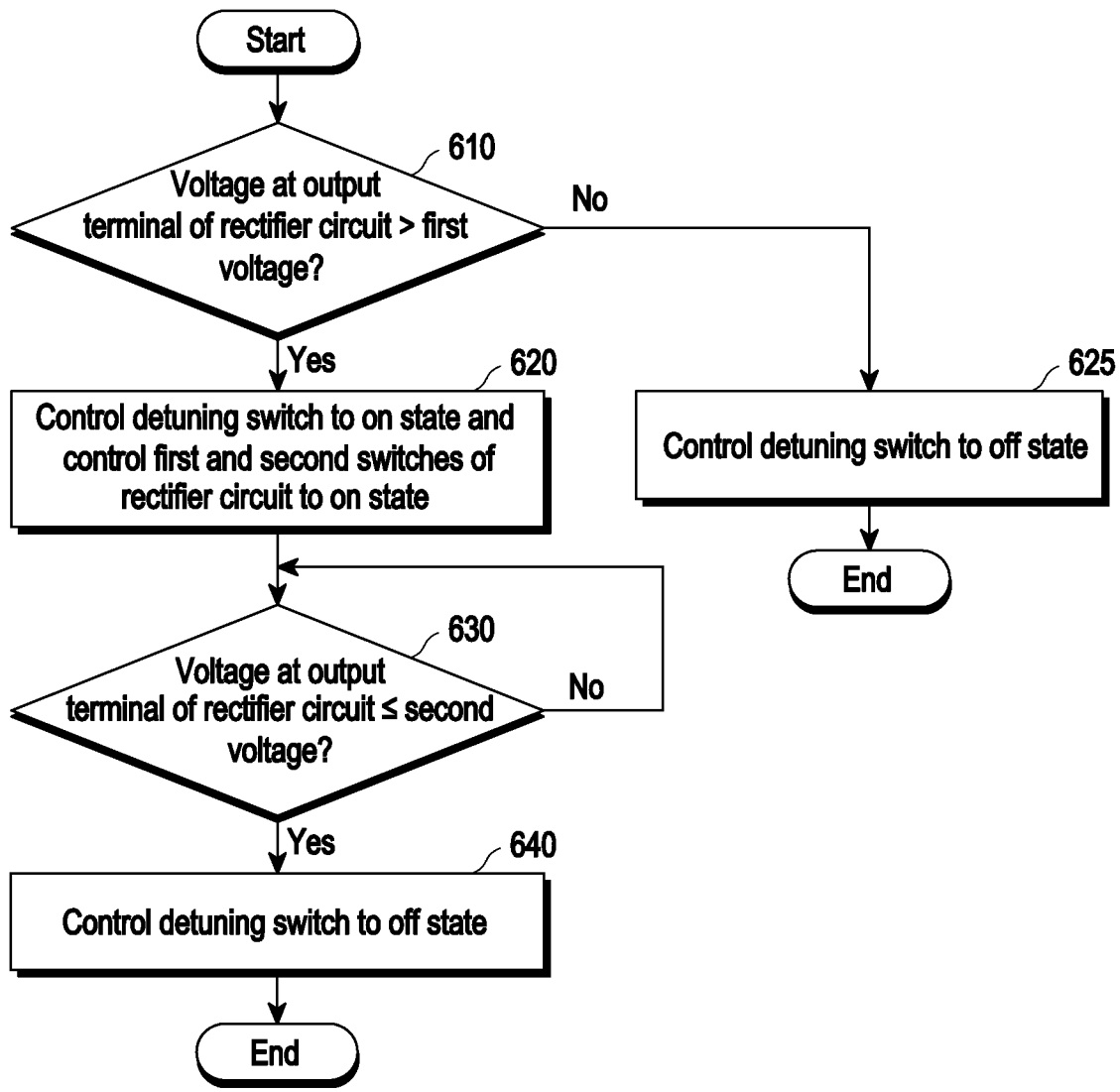
FIG. 6 is a flowchart illustrating operations performed by a wireless power reception device according to various embodiments.

FIG. 6 illustrates exemplary operations performed by a wireless power reception device according to various embodiments. In operation 610, a control circuit (e.g., the control circuit 500) of a wireless power reception device (e.g., the wireless power reception device 201) may identify whether a voltage of an output terminal of a rectifier circuit is higher than a first voltage. For example, referring to FIG. 2, the control circuit 500 may identify whether the voltage $V_o$ at the output terminals of the first rectifier circuit 230 and the second rectifier circuit 260 is higher than the first voltage. According to various embodiments, when the voltage of the output terminal of the rectifier circuit is higher than the first voltage, an overvoltage may be applied to the wireless power reception device 201.

When the voltage of the output terminal of the rectifier circuit is not higher than the first voltage, the control circuit 500 of the wireless power reception device 201 may control a detuning switch (e.g., the at least one detuning switch 252 and 254) to the off state in operation 625. According to various embodiments, in operation 625, the control circuit 500 of the wireless power reception device 201 may control switches of the rectifier circuit (e.g., the four switches 231, 232, 233, and 234 of the first rectifier circuit 230) to the off state or synchronously control the switches of the rectifier circuit. According to various embodiments, when the magnitude of received wireless power is greater than a specific magnitude, the control circuit 500 of the wireless power reception device 201 may synchronously control the switches of the rectifier circuit, whereas when the magnitude of received wireless power is smaller than the specific magnitude, the control circuit 500 may control the switches of the rectifier circuit to the off state. According to various embodiments, in operation 625, after controlling the switches of the rectifier circuit (e.g., the four switches 231, 232, 233, and 234 of the first rectifier circuit 230) to the off state or controlling the switches synchronously, the control circuit 500 of the wireless power reception device 201 may control the at least one detuning switch 252 and 254 to the off state.

Alternatively or additionally, according to various embodiments, in operation 625, the control circuit 500 of the wireless power reception device 201 may control the first switch 231 and the second switch 232 to the on state and the third switch 233 and the fourth switch 234 to the off state among the switches of the rectifier circuit (e.g., the four switches 231, 232, 233, and 234 of the first rectifier circuit 230). According to various embodiments, in operation 625, the control circuit 500 of the wireless power reception device 201 may control the first switch 231 and the second switch 232 to the on state and the third switch 233 and the fourth switch 234 to the off state among the switches of the rectifier circuit (e.g., the four switches 231, 232, 233, and 234 of the first rectifier circuit 230), after controlling the at least one detuning switch 252 and 254 to the off state.

When the voltage of the output terminal of the rectifier circuit is higher than the first voltage, the control circuit 500 of the wireless power reception device 201 may control a detuning switch (e.g., the at least one detuning switch 252 and 254) to the on state, and control the first switch (e.g., the first switch 231) and the second switch (e.g., the second switch 232) of the rectifier circuit (e.g., the first rectifier circuit 230) to the on state in operation 620. According to various embodiments, the control circuit 500 of the wireless power reception device 201 may control the first switch 231 and the second switch 232 of the first rectifier circuit 230 to the on state, after controlling the detuning switch (e.g., the at least one detuning switch 252 and 254) to the on state. According to various embodiments, the control circuit 500 of the wireless power reception device 201 may control the third switch 233 and the fourth switch 234 to the off state among the four switches 231, 232, 233, and 234 of the first rectifier circuit 230.

In operation 630, the control circuit 500 of the wireless power reception device 201 may identify whether the voltage at the output terminal of the rectifier circuit (e.g., the voltage $V_o$ at the output terminal of the first rectifier circuit 230) is less than or equal to a second voltage. According to various embodiments, the second voltage may be lower than the first voltage.

When the voltage of the output terminal of the rectifier circuit is higher than the second voltage in operation 630, the control circuit 500 of the wireless power reception device 201 may repeat operation 630 until the voltage of the output terminal of the rectifier circuit is identified as less than or equal to the second voltage.

When the voltage of the output terminal of the rectifier circuit is identified as less than or equal to the second voltage in operation 630, the control circuit 500 of the wireless power reception device 201 may control the detuning switch (e.g., the at least one detuning switch 252 and 254) to the off state in operation 640. According to various embodiments, details of operation 625 may be equally applied to operation 640.

Figure 7:
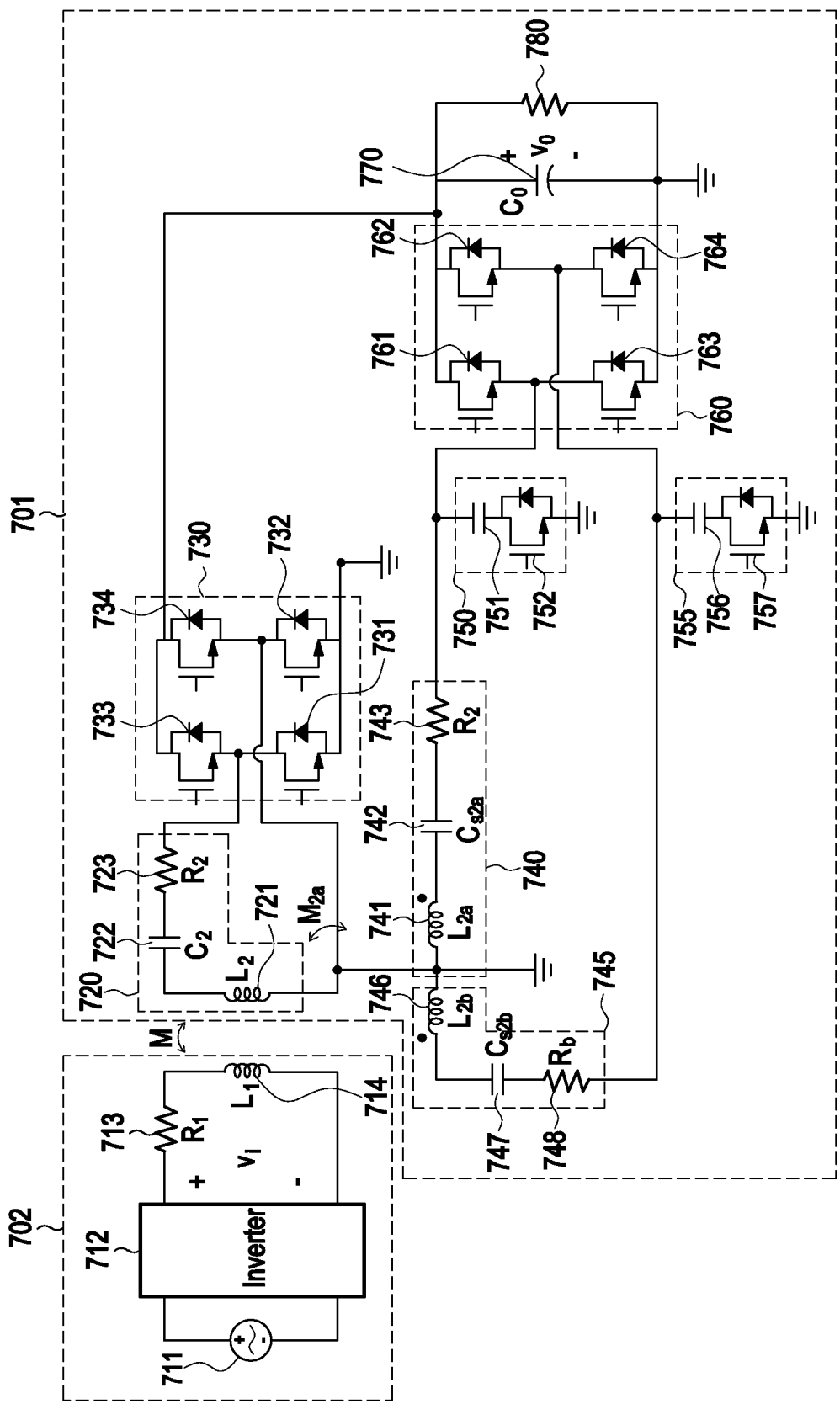
FIG. 7 is a circuit diagram illustrating a wireless power transmission device and a wireless power reception device according to various embodiments.

FIG. 7 is a circuit diagram illustrating a wireless power transmission device and a wireless power reception device according to various embodiments.

Referring to FIG. 7, a wireless power transmission device 702 may include a power source 711, an inverter 712, and a transmission coil 714. Details of the power source 211, the inverter 212, and the transmission coil 214 described above with reference to FIG. 2 may be equally applied to the power source 711, the inverter 712, and the transmission coil 714 of FIG. 7, respectively.

According to various embodiments, a wireless power reception device 701 may include a first circuit 720, a first rectifier circuit 730, a second circuit 740, a third circuit 745, a first detuning circuit 750, a second detuning circuit 755, a second rectifier circuit 760, a capacitor 770, and a load 780. Details of the first circuit 220, the first rectifier circuit 230, the second circuit 240, the capacitor 270, and the load 280 described above with reference to FIG. 2 may be equally applied to the first circuit 720, the first rectifier circuit 730, the second circuit 740, the capacitor 770, and the load 780 of FIG. 7, respectively.

According to various embodiments, the third circuit 745 may include a third coil 746 and a third capacitor 747, and the third coil 746 may include a parasitic resistor 748 with a resistance $R_b$. Like a second coil 741, the third coil 746 may be magnetically coupled to a first coil 721. The third circuit 745 may have a first terminal coupled to the first circuit 720, the second circuit 740, and the ground, and a second terminal coupled to the second detuning circuit 755 and a second input terminal of the second rectifier circuit 760.

According to various embodiments, the second detuning circuit 755 may include a second detuning capacitor 756 and a second detuning switch 757. While the second detuning circuit 755 is shown in FIG. 7 as including one second detuning capacitor 756 and one second detuning switch 757, the second detuning circuit 755 may include a plurality of second detuning capacitors 756 and a plurality of second detuning switches 757 according to various embodiments.

According to various embodiments, the second circuit 740 may have a first terminal coupled to the first circuit 720, the third circuit 745, and the ground, and a second terminal coupled to the first detuning circuit 750 and a first input terminal of the second rectifier circuit 760.

According to various embodiments, the first detuning circuit 750 may include a first detuning capacitor 751 and a first detuning switch 752. While the first detuning circuit 750 is shown in FIG. 7 as including one first detuning capacitor 751 and one first detuning switch 752, the first detuning circuit 750 may include a plurality of first detuning capacitors 751 and a plurality of first detuning switches 752 according to various embodiments.

According to various embodiments, the second rectifier circuit 760 may include four switches 761, 762, 763, and 764 which form a full bridge structure. According to various embodiments, a voltage applied to the gates of MOSFETs included in the four switches 761, 762, 763, and 764 may be controlled by a control circuit (e.g., the control circuit 500). The control circuit 500 may control the four switches 761, 762, 763, and 764 to the on state by applying a voltage equal to or higher than the threshold voltage of the MOSFETs to the gates of the MOSFETs included in the four switches 761, 762, 763, and 764, or control the four switches 761, 762, 763, and 764 to the off state by applying a voltage lower than the threshold voltage of the MOSFETs to the gates of the MOSFETs. While the four switches 761, 762, 763, and 764 are shown as including MOSFETs in FIG. 7, the second rectifier circuit 760 may be implemented with four diodes forming a full bridge structure according to various embodiments. According to various embodiments, an output terminal of the second rectifier circuit 760 may be coupled to an output terminal of the first rectifier circuit 730.

Although the operations of FIGS. 3 and 6 have been described mainly with respect to the wireless power reception device 201 of FIG. 2, the operations of FIGS. 3 and 6 may also be performed in the wireless power reception device 701 of FIG. 7 according to various embodiments.

For example, when the operations of FIG. 3 are performed by the wireless power reception device 701 of FIG. 7, in operation 310, the control circuit 500 may identify a voltage $V_o$ at the output terminals of the first rectifier circuit 730 and the second rectifier circuit 760. In operation 320, the control circuit 500 may control the first detuning switch 752 and the second detuning switch 757 to the on state. In operation 330, the control circuit 500 may control the first switch 731 and the second switch 732 of the first rectifier circuit 730 to the on state. In this case, the control circuit 500 may control the third switch 733 and the fourth switch 734 of the first rectifier circuit 730 to the off state. Further, in operation 330, the control circuit 500 may control the four switches 761, 762, 763, and 764 of the second rectifier circuit 760 to the off state or may control the four switches synchronously. When the magnitude of power received at the wireless power reception device 701 is equal to or greater than a specific level, the control circuit 500 may synchronously control the four switches 761, 762, 763, and 764 in operation 330. When the magnitude of the received power is less than the specific level, the control circuit 500 may control the four switches 761, 762, 763, and 764 to the off state in operation 330.

For example, when the operations of FIG. 6 are performed in the wireless power reception device 701 of FIG. 7, in operation 620, the control circuit 500 may control the first detuning switch 752 and the second detuning switch 757 to the on state, and control the first switch 731 and the second switch 732 of the first rectifier circuit 730 to the on state. In operation 620, the control circuit 500 may control the four switches 761, 762, 763, and 764 of the second rectifier circuit 760 to the off state or synchronously.

In operations 625 and 640, the control circuit 500 may control the first detuning switch 752 and the second detuning switch 757 to the off state.

In addition, the details of FIG. 6 described before with reference to FIG. 2 may also be applied in the same manner, when the operations of FIG. 6 are performed in the wireless power reception device 701 of FIG. 7.

Figure 8:
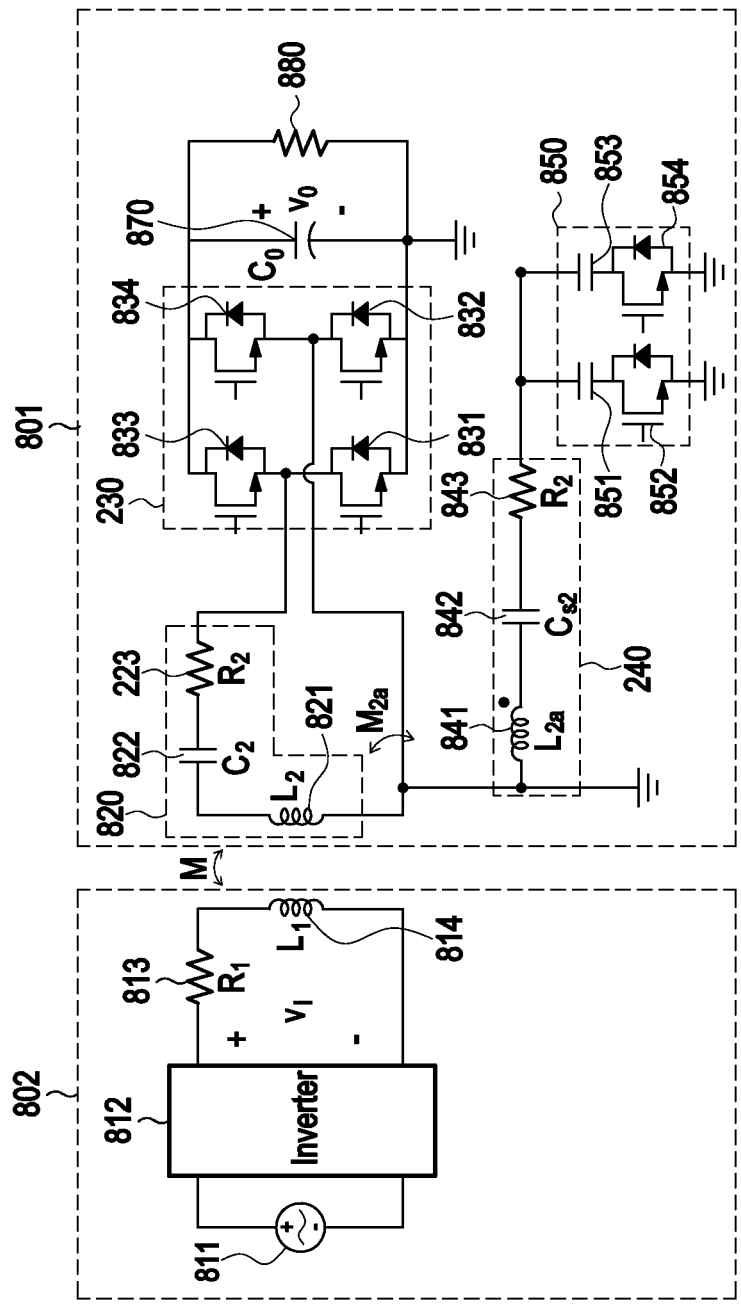
FIG. 8 is a circuit diagram illustrating a wireless power transmission device and a wireless power reception device according to various embodiments.

FIG. 8 is a circuit diagram illustrating a wireless power transmission device and a wireless power reception device according to various embodiments.

Referring to FIG. 8, a wireless power transmission device 802 may include a power source 811, an inverter 812, and a transmission coil 814. The details of the power source 211, the inverter 212, and the transmission coil 214 described before with reference to FIG. 2 may be equally applied to the power source 811, the inverter 812, and the transmission coil 814 of FIG. 8, respectively. Alternatively or additionally, the details of the power source 711, the inverter 712, and the transmission coil 714 described before with reference to FIG. 7 may be equally applied to the power source 811, the inverter 812, and the transmission coil 814 of FIG. 8, respectively.

According to various embodiments, a wireless power reception device 801 may include a first circuit 820, a rectifier circuit 830, a second circuit 840, a detuning circuit 850, a capacitor 870, and a load 880. The details of the first circuit 220, the first rectifier circuit 230, the second circuit 240, the detuning circuit 250, the capacitor 270, and the load 280 described above with reference to FIG. 2 may be equally applied to the first circuit 820, the rectifier circuit 830, the second circuit 840, the detuning circuit 850, the capacitor 870, and the load 880 of FIG. 8, respectively. Alternatively or additionally, the details of the first circuit 720, the first rectifier circuit 730, the second circuit 740, the first detuning circuit 750, the capacitor 770, and the load 780 described above with reference to FIG. 7 may be equally applied to the first circuit 820, the rectifier circuit 830, the second circuit 840, the detuning circuit 850, the capacitor 870, and the load 880 of FIG. 8, respectively.

While the operations of FIGS. 3 and 6 have been described mainly with respect to the wireless power reception device 201 of FIG. 2 and the wireless power reception device 701 of FIG. 7, the operations of FIGS. 3 and 6 may also be performed in the wireless power reception device 801 of FIG. 8 according to various embodiments.

For example, when the operations of FIG. 3 are performed in the wireless power reception device 801 of FIG. 8, in operation 310, a control circuit 500 may identify a voltage $V_o$ at an output terminal of the rectifier circuit 830. In operation 320, the control circuit 500 may control detuning switches 851 and 853 to the on state. In operation 330, the control circuit 500 may control a first switch 731 and a second switch 832 of the rectifier circuit 830 to the on state. In this case, the control circuit 500 may control a third switch 833 and a fourth switch 834 of the rectifier circuit 830 to the off state.

For example, when the operations of FIG. 6 are performed in the wireless power reception device 801 of FIG. 8, in operation 620, the control circuit 500 may control the detuning switches 851 and 853 to the on state, and control the first switch 831 and the second switch 832 of the rectifier circuit 830 to the on state. In operations 625 and 640, the control circuit 500 may control the detuning switches 851 and 853 to the off state. In addition, the details of FIG. 6 described before with reference to FIG. 2 and to FIG. 7 may also be applied in the same manner, when the operations of FIG. 6 are performed in the wireless power reception device 801 of FIG. 8.

Figure 9:
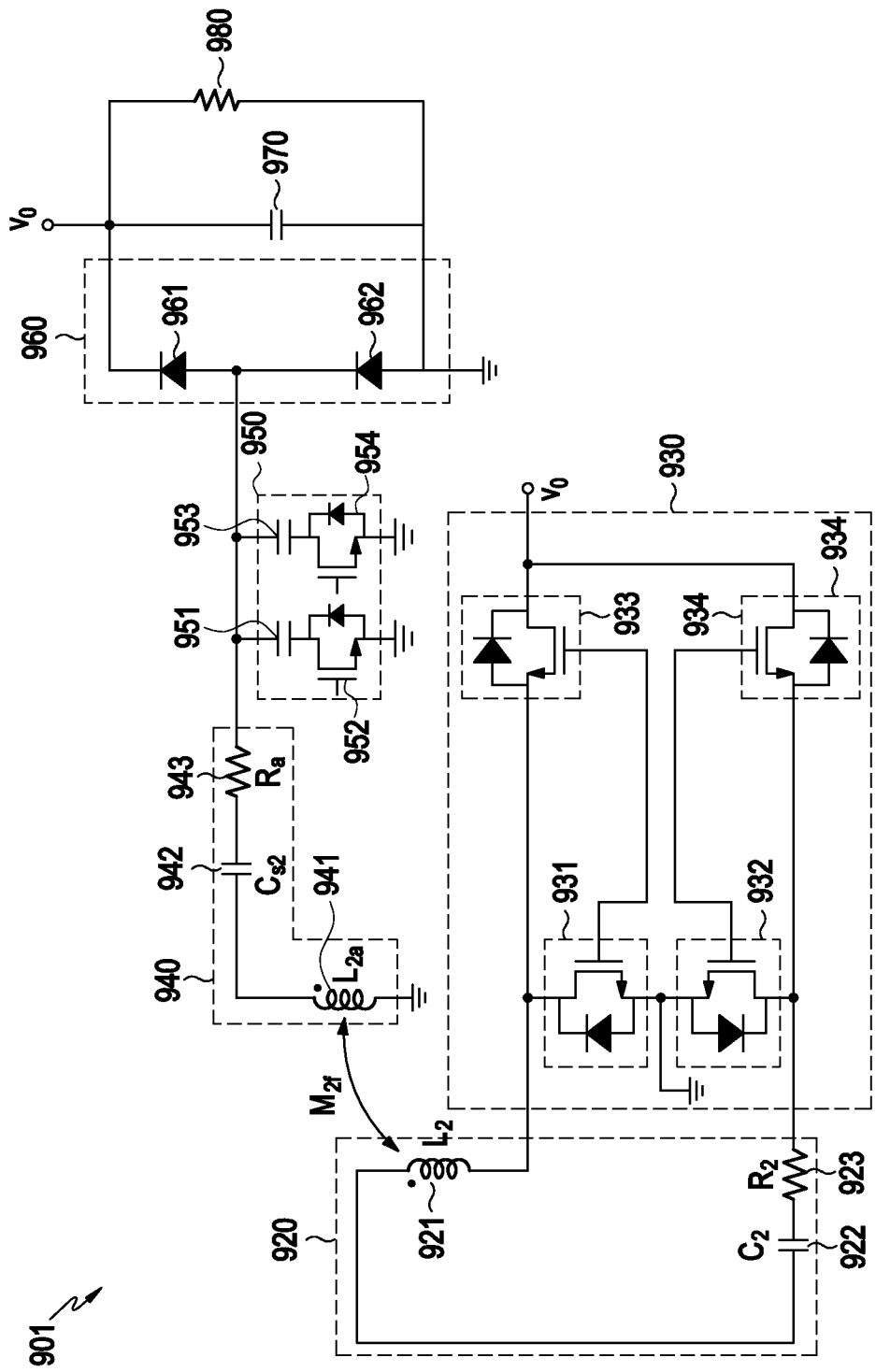
FIG. 9 is a circuit diagram illustrating a wireless power reception device according to various embodiments.

FIG. 9 is a circuit diagram illustrating a wireless power reception device according to various embodiments.

According to various embodiments, a wireless power reception device 901 may include a first circuit 920, a first rectifier circuit 930, a second circuit 940, a detuning circuit 950, a second rectifier circuit 960, a capacitor 970, and a load 980.

According to various embodiments, the first circuit 920 may include a first coil 921 and a first capacitor 922, and the first coil 921 may have a parasitic resistor 923 with a resistance $R_2$. The first circuit 920 may have a first terminal coupled to a first input terminal of the first rectifier circuit 930 and a second terminal coupled to a second input terminal of the first rectifier circuit 930. As the magnitude of a magnetic field generated by the transmission coil 914 changes, an induced electromotive force may be generated in the first coil 921. Generation of an induced electromotive force in the first coil 921 may be expressed as reception of wireless power in the first circuit 920 or the wireless power reception device 901.

According to various embodiments, the first rectifier circuit 930 may include four switches 931, 932, 933, and 934 which form a full bridge structure. Each of the four switches 931, 932, 933, and 934 may be an N-channel MOSFET and have a body diode. The first rectifier circuit 930 may rectify the wireless power received from the first circuit 920 from an AC form to a DC form, so that a rectified voltage $V_o$ is applied to both terminals of the capacitor 970. According to various embodiments, first terminals of a first switch 931 and a second switch 932 in the first rectifier circuit 930 may be coupled to the ground. A point between the third switch 933 and the fourth switch 934 may be defined as an output terminal of the first rectifier circuit 930.

According to various embodiments, a voltage applied to the gates of MOSFETs included in the four switches 931, 932, 933, and 934 may be controlled by a control circuit (e.g., the control circuit 500). The control circuit 500 may control the four switches 931, 932, 933, and 934 to the on state by applying a voltage equal to or higher than the threshold voltage of the MOSFETs to the gates of the MOSFETs included in the four switches 931, 932, 933, and 934, or control the four switches 931, 932, 933, and 934 to the off state by applying a voltage lower than the threshold voltage of the MOSFETs to the gates of the MOSFETs.

According to various embodiments, the second circuit 940 may include a second coil 941 and a second capacitor 942. The second coil 941 may have a parasitic resistor 943 with a resistance $R_a$. A first terminal of the second circuit 940 may be coupled to the ground, and a second terminal of the second circuit 940 may be coupled to the second rectifier circuit 960 and the detuning circuit 950.

According to various embodiments, the detuning circuit 950 may include at least one detuning capacitor 951 and 953 and at least one detuning switch 952 and 954. Although the two detuning capacitors 951 and 953 and the two detuning switches 952 and 954 are illustrated in FIG. 9, the number of detuning capacitors and the number of detuning switches included in the detuning circuit 950 are not limited according to various embodiments. According to various embodiments, the number of detuning capacitors included in the detuning circuit 950 may be equal to that of detuning switches included in the detuning circuit 950. According to various embodiments, a first terminal of the detuning circuit 950 may be coupled to a second terminal of the second circuit 940 and the second rectifier circuit 960, and a second terminal of the detuning circuit 950 may be coupled to the ground.

According to various embodiments, each of the at least one detuning switch 952 and 954 may be an N-channel MOSFET and have a body diode. According to various embodiments, a voltage applied to the gates of MOSFETs included in the at least one detuning switch 952 and 954 may be controlled by the control circuit 500. The control circuit 500 may control the at least one detuning switch 952 and 954 to the on state by applying a voltage equal to or greater than the threshold voltage of the MOSFETs to the gates of the MOSFETs included in the at least one detuning switch 952 and 954 or control the at least one detuning switch 952 and 954 to the off state by applying a voltage less than the threshold voltage of the MOSFETs to the gates of the MOSFETs.

According to various embodiments, the second rectifier circuit 960 may include two diodes 961 and 962 forming a half bridge structure. Alternatively or additionally, the second rectifier circuit 960 may include two MOSFETs forming the half bridge structure. According to various embodiments, an output terminal of the second rectifier circuit 960 may be coupled to the output terminal of the first rectifier circuit 930.

According to various embodiments, the load 980 may include a control circuit 500 for generating a drive signal to control the four switches 931, 932, 933, and 934, and the at least one detuning switch 952 and 954, a DC/DC converter, an LDO, and a battery.

While the operations of FIGS. 3 and 6 have been described mainly with respect to the wireless power reception device 201 of FIG. 2, the wireless power reception device 701 of FIG. 7, and the wireless power reception device 801 of FIG. 8, the operations of FIGS. 3 and 6 may also be performed in the wireless power reception device 901 of FIG. 9.

According to various embodiments, the wireless power reception device 201 for receiving wireless power from the wireless power transmission device 202 may include the first circuit 220, the first rectifier circuit 230, the second circuit 240, the detuning circuit 250, and the control circuit. The first circuit 220 may include the first coil 221, and the first terminal of the first circuit 220 may be coupled to the ground and the first terminal of the first rectifier circuit 230. The first rectifier circuit 230 may include the plurality of switches 231, 232, 233, and 234, and the first terminal of the first switch 231 and the first terminal of the second switch 232 among the plurality of switches 231, 232, 233, and 234 may be coupled to the ground. The second circuit 240 may include the second coil 241. The first terminal of the second circuit 240 may be coupled to the ground and the first terminal of the first circuit 220. The second terminal of the second circuit 240 may be coupled to the first terminal of the detuning circuit 250. The detuning circuit 250 may include the at least one detuning capacitor 251 and 253 and the at least one detuning switch 252 and 254, and the second terminal of the detuning circuit 250 may be coupled to the ground. In response to a voltage at the output terminal of the first rectifier circuit 230 exceeding a first voltage, the control circuit is configured to form a closed loop including the first coil 221, the first switch 231, and the second switch 232 by controlling the at least one detuning switch 252 and 254 to the on state and controlling the first switch 231 and the second switch 232 to the on state.

According to various embodiments, when the control circuit controls the first switch 231 and the second switch 232 to the on state, the wireless power reception device may be configured to receive the wireless power by an electromotive force induced in the second coil 241 based on a magnetic field formed by a current flowing in the closed loop including the first coil 221, the first switch 231, and the second switch 232.

According to various embodiments, in response to the voltage at the output terminal of the first rectifier circuit 230 exceeding the first voltage, the control circuit may be configured to control the first switch 231 and the second switch 232 to the on state, after controlling the at least one detuning switch 252 and 254 to the on state.

According to various embodiments, the control circuit may be configured to identify that the voltage at the output terminal of the first rectifier circuit 230 is lower than or equal to a second voltage, while the at least one detuning switch 252 and 254 is controlled to the on state, and the first switch 231 and the second switch 232 are controlled to the on state, and in response to the voltage at the output terminal of the first rectifier circuit 230 being identified as lower than or equal to the second voltage, control the at least one detuning switch 252 and 254 to an off state.

According to various embodiments, in response to the voltage at the output terminal of the first rectifier circuit 230 being identified as lower than or equal to the second voltage, the control circuit is configured to control the plurality of switches 231, 232, 233, and 234 to the off state.

According to various embodiments, in response to the voltage at the output terminal of the first rectifier circuit 230 being identified as lower than or equal to the second voltage, the control circuit may be configured to control the at least one detuning switch 252 and 254 to the off state after controlling the plurality of switches 231, 232, 233, and 234 to the off state.

According to various embodiments, in response to the voltage at the output terminal of the first rectifier circuit 230 being identified as lower than or equal to the second voltage, the control circuit may be configured to control the plurality of switches 231, 232, 233, and 234 synchronously.

According to various embodiments, in response to the voltage at the output terminal of the first rectifier circuit 230 being identified as lower than or equal to the second voltage, the control circuit may be configured to control the at least one detuning switch 252 and 254 to the off state after controlling the plurality of switches 231, 232, 233, and 234 synchronously.

According to various embodiments, the wireless power reception device 901 may further include the second rectifier circuit 260 coupled to the second terminal of the second circuit 240 and the first terminal of the at least one detuning circuit 250, and then output terminal of the second rectifier circuit 260 may be coupled to the output terminal of the first rectifier circuit 230.

According to various embodiments, the second rectifier circuit 260 may be a half bridge rectifier circuit.

According to various embodiments, the wireless power reception device may further include the third circuit 745 including the third coil 746, and the second detuning circuit 755. The first terminal of the third circuit 745 may be coupled to the ground, the first terminal of the first circuit 720, and the first terminal of the second circuit 740. The second detuning circuit 755 may include the at least one second detuning capacitor 756 and the at least one second detuning switch 757. The second terminal of the third circuit 745 may be coupled to the first terminal of the second detuning circuit 755. The second terminal of the second detuning circuit 755 may be coupled to the ground. The second rectifier circuit 760 may be coupled to the second terminal of the third circuit 745. The second rectifier circuit 760 may be a full bridge rectifier circuit.

According to various embodiments, the wireless power reception device 901 for receiving wireless power from a wireless power transmission device may include the first circuit 920, the first rectifier circuit 930, the second circuit 940, the detuning circuit 950, the second rectifier circuit 960, and the control circuit. The first circuit 920 may include the first coil 921, and the first terminal and the second terminal of the first circuit 920 are coupled to the first rectifier circuit 930. The first rectifier circuit 930 may include the plurality of switches 931, 932, 933, and 934, and the first terminal of the first switch 931 and the first terminal of the second switch 932 among the plurality of switches 931, 932, 933, and 934 may be coupled to the ground. The second circuit 940 may include the second coil 941. The first terminal of the second circuit 940 may be coupled to the ground. The second terminal of the second circuit 940 may be coupled to the first terminal of the detuning circuit 950. The detuning circuit 950 may include the at least one detuning capacitor 951 and 953 and the at least one detuning switch 952 and 954, and the second terminal of the detuning circuit 950 may be coupled to the ground. The second rectifier circuit 960 may be coupled to the second terminal of the first circuit 920 and the first terminal of the detuning circuit 950, and the output terminal of the second rectifier circuit 960 may be coupled to the output terminal of the first rectifier circuit 930. In response to a voltage at the output terminal of the first rectifier circuit 930 exceeding a first voltage, the control circuit may be configured to control the at least one detuning switch 952 and 954 to an on state and control the first switch 931 and the second switch 932 to the on state.

According to various embodiments, a method of controlling the wireless power reception device 201 including the first circuit 220 including the first coil 221 for receiving wireless power, the second circuit 240 including the second coil 241, the rectifier circuit configured to rectify the wireless power, and the detuning circuit 250 coupled to the second circuit 240 may include identifying a voltage at the output terminal of the rectifier circuit of the wireless power reception device 201, controlling the at least one detuning switch 252 and 254 included in the detuning circuit 250 of the wireless power reception device 201 to an on state, in response to the voltage at the output terminal of the rectifier circuit exceeding a first voltage, and forming a closed loop by the first coil 221, the first switch 231, and the second switch 232 by controlling the first switch 231 of the wireless power reception device 201 and the second switch 232 of the wireless power reception device 201 which are coupled to the ground to the on state among the plurality of switches 231, 232, 233, and 234 included in the rectifier circuit.

According to various embodiments, the controlling of the first switch 231 and the second switch 232 may comprise controlling the first switch 231 and the second switch 232 to the on state after the controlling of the at least one detuning switch 252 and 254 to the on state.

According to various embodiments, the method may further include controlling the third switch and the fourth switch among the plurality of switches 231, 232, 233, and 234 to an off state, in response to the voltage at the output terminal of the rectifier circuit exceeding the first voltage.

According to various embodiments, the method may further include identifying that the voltage at the output terminal of the rectifier circuit is lower than or equal to a second voltage, while the at least one detuning switch 252 and 254 is controlled to the on state, and the first switch 231 and the second switch 234 are controlled to the on state, and in response to the voltage at the output terminal of the rectifier circuit being identified as lower than or equal to the second voltage, controlling the at least one detuning switch 252 and 254 to the off state.

According to various embodiments, the method may further include controlling the plurality of switches 231, 232, 233, and 234 to the off state, in response to the voltage at the output terminal of the rectifier circuit being identified as lower than or equal to the second voltage.

According to various embodiments, the controlling of the at least one detuning switch 252 and 254 to the off state may comprise controlling the at least one detuning switch 252 and 254 to the off state after the controlling of the plurality of switches 231, 232, 233, and 234 to the off state.

According to various embodiments, the method may further comprise controlling the plurality of switches 231, 232, 233, and 234 synchronously, in response to the voltage at the output terminal of the rectifier circuit being identified as lower than or equal to the second voltage.

According to various embodiments, the controlling of the at least one detuning switch 252 and 254 to the off state may comprise controlling the at least one detuning switch 252 and 254 to the off state after the controlling of the plurality of switches 231, 232, 233, and 234 synchronously.

According to various embodiments, the wireless power reception device 201 for receiving wireless power from the wireless power transmission device 202 may include the first circuit 220, the first rectifier circuit 230, the second circuit 240, the detuning circuit 250, and the control circuit. The first circuit 220 may include the first coil 221, and the first terminal of the first circuit 220 may be coupled to the ground and the first terminal of the first rectifier circuit 230. The first rectifier circuit 230 may include the plurality of switches 231, 232, 233, and 234, and the first terminal of the first switch 231 and the first terminal of the second switch 232 among the plurality of switches 231, 232, 233, and 234 may be coupled to the ground. The second circuit 240 may include the second coil 241. The first terminal of the second circuit 240 may be coupled to the ground and the first terminal of the first circuit 220. The second terminal of the second circuit 240 may be coupled to the first terminal of the detuning circuit 250. The detuning circuit 250 may include the at least one detuning capacitor 251 and 253 and the at least one detuning switch 252 and 254, and the second terminal of the detuning circuit 250 may be coupled to the ground. The control circuit may be configured to identify that the voltage at the output terminal of the first rectifier circuit 230 is lower than or equal to a first voltage, while the at least one detuning switch 252 and 254 is controlled to the on state, and the first switch 231 and the second switch 232 are controlled to the on state, and in response to the voltage at the output terminal of the first rectifier circuit 230 being identified as lower than or equal to the first voltage, control the at least one detuning switch 252 and 254 to an off state.

According to various embodiments, in response to the voltage at the output terminal of the first rectifier circuit 230 exceeding a second voltage, the control circuit is configured to form a closed loop including the first coil 221, the first switch 231, and the second switch 232 by controlling the at least one detuning switch 252 and 254 to the on state and controlling the first switch 231 and the second switch 232 to the on state.

According to various embodiments, in response to the voltage at the output terminal of the first rectifier circuit 230 being identified as lower than or equal to the first voltage, the control circuit is configured to control the four switches 231, 232, 233, and 234 to the off state.

According to various embodiments, in response to the voltage at the output terminal of the first rectifier circuit 230 being identified as lower than or equal to the first voltage, the control circuit is configured to control the at least one detuning switch 252 and 254 to the off state after controlling the four switches 231, 232, 233, and 234 to the off state.

The wireless power reception device according to various embodiments may be one of various types of electronic devices. The wireless power reception device may include, for example, a portable communication device (e.g., a smartphone), a computer device, a portable multimedia device, a portable medical device, a camera, a wearable device, or a home appliance. According to an embodiment of the disclosure, the wireless power reception device is not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd" or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., an internal memory or an external memory) that is readable by a machine (e.g., an electronic device). For example, a processor (e.g., the processor 540) of the machine (e.g., the electronic device, a wireless reception device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. A wireless power reception device for receiving wireless power from a wireless power transmission device, the wireless power reception device comprising:
a first circuit, a first rectifier circuit, a second rectifier circuit, a second circuit, a detuning circuit, and a control circuit,
wherein the first circuit includes a first coil, and a first terminal of the first circuit is coupled to a ground and to a first terminal of the first rectifier circuit,
wherein the first rectifier circuit includes a plurality of switches, and a first terminal of a first switch and a first terminal of a second switch among the plurality of switches are coupled to the ground,
wherein the second circuit includes a second coil, a first terminal of the second circuit is coupled to the ground and to the first terminal of the first circuit, and a second terminal of the second circuit is coupled to a first terminal of the detuning circuit and the second rectifier circuit,
wherein the detuning circuit includes at least one detuning capacitor and at least one detuning switch, and a second terminal of the detuning circuit is coupled to the ground, and
wherein in response to a voltage level at an output terminal of the first rectifier circuit exceeding a first voltage level, the control circuit is configured to control the at least one detuning switch to an on state and control, for forming a closed loop including the first coil, the first switch, and the second switch, the first switch and the second switch to the on state.

2. The wireless power reception device of claim 1, wherein the wireless power reception device is configured to receive, when the control circuit controls the first switch and the second switch to the on state, the wireless power by an electromotive force induced in the second coil based on a magnetic field produced by a current flowing in the closed loop including the first coil, the first switch, and the second switch.

3. The wireless power reception device of claim 1, wherein the control circuit is configured to control, in response to the voltage level at the output terminal of the first rectifier circuit exceeding the first voltage level, the first switch and the second switch to the on state, after controlling the at least one detuning switch to the on state.

4. The wireless power reception device of claim 1, wherein the control circuit is configured to:
identify that the voltage level at the output terminal of the first rectifier circuit is lower than or equal to a second voltage level, while the at least one detuning switch is controlled to the on state, and the first switch and the second switch are controlled to the on state, and
control, in response to the voltage level at the output terminal of the first rectifier circuit being identified as lower than or equal to the second voltage level, the at least one detuning switch to an off state.

5. The wireless power reception device of claim 4, wherein the control circuit is configured to control, in response to the voltage level at the output terminal of the first rectifier circuit being identified as lower than or equal to the second voltage level, the plurality of switches to the off state.

6. The wireless power reception device of claim 5, wherein the control circuit is configured to control, in response to the voltage level at the output terminal of the first rectifier circuit being identified as lower than or equal to the second voltage level, the at least one detuning switch to the off state after controlling the plurality of switches to the off state.

7. The wireless power reception device of claim 4, wherein the control circuit is configured to control, in response to the voltage level at the output terminal of the first rectifier circuit being identified as lower than or equal to the second voltage level, the plurality of switches synchronously.

8. The wireless power reception device of claim 7, wherein the control circuit is configured to control, in response to the voltage level at the output terminal of the first rectifier circuit being identified as lower than or equal to the second voltage level, the at least one detuning switch to the off state after controlling the plurality of switches synchronously.

9. The wireless power reception device of claim 1, wherein an output terminal of the second rectifier circuit is coupled to the output terminal of the first rectifier circuit.

10. The wireless power reception device of claim 9, wherein the second rectifier circuit is a half bridge rectifier circuit.

11. The wireless power reception device of claim 9, further comprising a third circuit including a third coil, and a second detuning circuit,
wherein a first terminal of the third circuit is coupled to the ground, the first terminal of the first circuit, and the first terminal of the second circuit,
wherein the second detuning circuit includes at least one second detuning capacitor and at least one second detuning switch,
wherein a second terminal of the third circuit is coupled to a first terminal of the second detuning circuit,
wherein a second terminal of the second detuning circuit is coupled to the ground,
wherein the second rectifier circuit is coupled to the second terminal of the third circuit, and
wherein the second rectifier circuit is a full bridge rectifier circuit.

12. A method of controlling a wireless power reception device, comprising:
identifying a voltage level at an output terminal of a first rectifier circuit of the wireless power reception device,
in response to the voltage level exceeding a first voltage level, controlling at least one detuning switch included in a detuning circuit of the wireless power reception device to an on state and controlling, for forming a closed loop including a first coil, a first switch and a second switch, the first switch and the second switch which are coupled to a ground to the on state among a plurality of switches included in the first rectifier circuit, wherein the first coil is coupled to the first rectifier circuit, and
receiving a wireless power by an electromotive force induced in a second coil based on a magnetic field produced by a current flowing in the closed loop, wherein the second coil is coupled to the detuning circuit and a second rectifier circuit.

13. The method of claim 12, wherein the controlling of the first switch and the second switch comprises controlling the first switch and the second switch to the on state after the controlling of the at least one detuning switch to the on state.

14. The method of claim 12, further comprising controlling a third switch and a fourth switch among the plurality of switches to an off state, in response to the voltage level at the output terminal of the rectifier circuit exceeding the first voltage level.

15. The method of claim 12, further comprising:
identifying that the voltage level at the output terminal of the rectifier circuit is lower than or equal to a second voltage level, while the at least one detuning switch is controlled to the on state, and the first switch and the second switch are controlled to the on state, and
controlling, in response to the voltage level at the output terminal of the rectifier circuit being identified as lower than or equal to the second voltage level, the at least one detuning switch to an off state.

16. The method of claim 15, further comprising controlling the plurality of switches to the off state, in response to the voltage level at the output terminal of the rectifier circuit being identified as lower than or equal to the second voltage level.

17. The method of claim 16, wherein the controlling of the at least one detuning switch to the off state comprises controlling the at least one detuning switch to the off state after the controlling of the plurality of switches to the off state.

18. The method of claim 15, further comprising controlling the plurality of switches synchronously, in response to the voltage level at the output terminal of the rectifier circuit being identified as lower than or equal to the second voltage level.

19. The method of claim 18, wherein the controlling of the at least one detuning switch to the off state comprises controlling the at least one detuning switch to the off state after the controlling of the plurality of switches synchronously.

20. A wireless power reception device for receiving wireless power from a wireless power transmission device, the wireless power reception device comprising:
a first circuit, a first rectifier circuit, a second circuit, a detuning circuit, a second rectifier circuit, and a control circuit,
wherein the first circuit includes a first coil, and a first terminal and a second terminal of the first circuit are coupled to the first rectifier circuit,
wherein the first rectifier circuit includes a plurality of switches, and a first terminal of a first switch and a first terminal of a second switch among the plurality of switches are coupled to a ground, wherein the second circuit includes a second coil, a first terminal of the second circuit is coupled to the ground, and a second terminal of the second circuit is coupled to a first terminal of the detuning circuit, wherein the detuning circuit includes at least one detuning capacitor and at least one detuning switch, and a second terminal of the detuning circuit is coupled to the ground, wherein the second rectifier circuit is coupled to the second terminal of the first circuit and the first terminal of the detuning circuit, and an output terminal of the second rectifier circuit is coupled to an output terminal of the first rectifier circuit, and wherein in response to a voltage level at the output terminal of the first rectifier circuit exceeding a first voltage level, the control circuit is configured to control the at least one detuning switch to an on state and control the first switch and the second switch to the on state.

21. A wireless power reception device for receiving wireless power from a wireless power transmission device, the wireless power reception device comprising:

a first circuit, a first rectifier circuit, a second circuit, a detuning circuit, and a control circuit, wherein the first circuit includes a first coil, and a first terminal of the first circuit is coupled to a ground and to a first terminal of the first rectifier circuit, wherein the first rectifier circuit includes four switches, and a first terminal of a first switch and a first terminal of a second switch among the four switches are coupled to the ground, wherein the second circuit includes a second coil, a first terminal of the second circuit is coupled to the ground and to the first terminal of the first circuit, and a second terminal of the second circuit is coupled to a first terminal of the detuning circuit, wherein the detuning circuit includes at least one detuning capacitor and at least one detuning switch, and a second terminal of the detuning circuit is coupled to the ground, and wherein the control circuit is configured to:

identify that a voltage level at an output terminal of the first rectifier circuit is lower than or equal to a first voltage level, while the at least one detuning switch is controlled to the on state, and the first switch and the second switch are controlled to the on state, and control, in response to the voltage level at the output terminal of the first rectifier circuit being identified as lower than or equal to the first voltage level, the at least one detuning switch to an off state.

22. The wireless power reception device of claim 21, wherein, in response to the voltage level at the output terminal of the first rectifier circuit exceeding a second voltage level, the control circuit is configured to control the at least one detuning switch to an on state and control, for forming a closed loop including the first coil, the first switch, and the second switch, the first switch and the second switch to the on state.

23. The wireless power reception device of claim 21, wherein the control circuit is configured to control, in response to the voltage level at the output terminal of the first rectifier circuit being identified as lower than or equal to the first voltage level, the four switches to the off state.

24. The wireless power reception device of claim 23, wherein the control circuit is configured to control, in response to the voltage level at the output terminal of the first rectifier circuit being identified as lower than or equal to the first voltage level, the at least one detuning switch to the off state after controlling the four switches to the off state.

* * * * *